(12) United States Patent
Wu (10) Patent No.: US 10,218,865 B2
(45) Date of Patent: Feb. 26, 2019

(54) PAPER THICKNESS DETECTING DEVICE AND IMAGE FORMING APPARATUS

(71) Applicant: KONICA MINOLTA, INC., Chiyoda-ku Tokyo (JP)

(72) Inventor: Yue Wu, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/878,757

(22) Filed: Jan. 24, 2018

(65) Prior Publication Data

US 2018/0213100 A1 Jul. 26, 2018

(30) Foreign Application Priority Data

Jan. 24, 2017 (JP) .................. 2017-010032

(51) Int. Cl.
| | | |
|---|---|---|
| G06K 15/00 | (2006.01) | |
| H04N 1/00 | (2006.01) | |
| B65H 1/04 | (2006.01) | |
| B65H 3/06 | (2006.01) | |
| B65H 7/02 | (2006.01) | |
| B65H 1/14 | (2006.01) | |
| G03G 15/00 | (2006.01) | |

(Continued)

(52) U.S. Cl.
CPC ........... *H04N 1/00716* (2013.01); *B65H 1/04* (2013.01); *B65H 1/14* (2013.01); *B65H 3/06* (2013.01); *B65H 5/062* (2013.01); *B65H 7/02* (2013.01); *B65H 7/20* (2013.01); *G03G 15/5029* (2013.01); *G03G 15/6588* (2013.01); *G03G 15/6594* (2013.01); *H04N 1/00549* (2013.01); *H04N 1/00602* (2013.01); *H04N 1/00732* (2013.01); *B65H 2404/133* (2013.01); *B65H 2404/1341* (2013.01); *B65H 2404/143* (2013.01); *B65H 2404/144* (2013.01); *B65H 2511/13* (2013.01); *B65H 2511/224* (2013.01); *B65H 2511/414* (2013.01); *B65H 2511/416* (2013.01); *B65H 2553/61* (2013.01); *B65H 2801/03* (2013.01); *G03G 2215/00738* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0328738 A1* | 12/2010 | Uchida | .................. | B65H 5/062 358/498 |
| 2012/0137533 A1* | 6/2012 | Muranaka | ................ | B65H 7/02 33/833 |
| 2014/0092456 A1* | 4/2014 | Ukai | .................. | H04N 1/00588 358/498 |

FOREIGN PATENT DOCUMENTS

JP 2002187641 A 7/2002

* cited by examiner

*Primary Examiner* — Henok Shiferaw
(74) *Attorney, Agent, or Firm* — Cantor Colburn LLP (57) ABSTRACT

A paper thickness detecting device that detects a paper thickness in accordance with a detection signal of a displacement sensor, includes: a pair of paper thickness detecting rollers including a first roller and a second roller that pinch a paper conveyed via a pair of conveyance rollers; and the displacement sensor that detects a displacement amount of the pair of paper thickness detecting rollers at the time when the paper passes through the pair of paper thickness detecting rollers, wherein the paper thickness is detected on the basis of the displacement amount of the pair of paper thickness detecting rollers that follows to rotate with respect to the paper conveyed via the pair of conveyance rollers.

13 Claims, 7 Drawing Sheets

(51) Int. Cl.
*B65H 5/06* (2006.01)
*B65H 7/20* (2006.01)

PAPER THICKNESS DETECTING DEVICE AND IMAGE FORMING APPARATUS

CROSS REFERENCE TO PRIOR APPLICATIONS

The present invention claims priority under 35 U.S.C. § 119 to Japanese Application No. 2017-010032 filed Jan. 24, 2017, the entire content of which is incorporated herein by reference.

BACKGROUND

Technological Field

The present invention relates to a paper thickness detecting device and an image forming apparatus including the paper thickness detecting device.

Description of the Related art

Some image forming apparatuses such as copying machines and printers have a paper thickness detecting device for detecting the thickness of a paper including a document. Paper thickness detecting devices detect the thickness of a paper for example from the displacement of a roller when the paper passes through a nip part of a pair of rollers that conveys the paper. By using a paper thickness detecting device, it is possible to control the paper conveyance speed or the fixing temperature according to the paper thickness, thereby enabling improving the image quality.

Moreover, in a highly functional image forming apparatuses such as a multifunction peripheral (MFP), control is performed to enable output of preferable image quality by optimizing parameters such as the fixing temperature and transfer conditions with respect to the basis weight, the heat capacity, and the surface resistivity of a paper to be printed. Therefore, it is necessary that a user selects the paper type at the time of printing and inputs information to the MFP what type of paper is to be printed.

However, since it is very difficult for most of general users to distinguish the paper type, it is not always the case that an appropriate paper type is set.

Therefore, in recent years, it has been proposed that MFPs have a function of automatically discriminating the paper type and automatically set the optimum paper type. There are various methods for discrimination of the paper type. For example, there are methods of discriminating the paper type by utilizing the fact that the basis weight and the heat capacity are highly correlated with the paper thickness and collating data obtained by actually measuring the paper thickness with a paper thickness database of each paper type.

This paper type discrimination by the paper thickness has an advantage that the paper thickness can be measured accurately by providing a simple paper thickness measuring mechanism in a paper passing path.

Among these methods, especially a paper thickness detection method of pinching a paper by a pair of detection rollers and reading the amount of displacement by a displacement sensor using one of the rollers as a reference has a simple structure and can be incorporated in a conventional conveyance path with low cost and thus is widely used.

However, although this paper thickness detection method has a simple structure, one of the pair of detection rollers is a driving roller, and thus vibration occurs in the vertical direction with respect to a gear axis, which is transmitted to the pair of detection rollers, and thus the amount of displacement tends to fluctuate. This may affect the accuracy of measurement of the paper thickness. In particular, the source of vibration is often located at an end part of a roller shaft. Vibration fluctuates depending on the distance between the source of vibration and the detection rollers, which affects the accuracy of paper thickness detection.

Thus proposed is a method of calculating the thickness of a sheet material on the basis of detection data when conveyance of the sheet material is stopped while the sheet material is interposed and data of rollers before interposing the sheet material in the same phase (see, for example, JP 2002-187641 A).

In a method described in JP 2002-187641 A, since conveyance of a paper is stopped in order to detect the paper thickness with high accuracy, there is a problem that the productivity is deteriorated.

In order to improve the accuracy of paper thickness detection without deteriorating the productivity, it is conceivable to increase the pressure between the pair of detection rollers to suppress the vibration; however, this may disadvantageously deteriorate the performance of passing a paper. Moreover, a stable measurement value of the paper thickness can be obtained by allowing the pair of detection rollers to follow; however, the conveyance resistance at the time of entry of a paper into a nip part of the pair of detection rollers becomes large. This results in a problem that it is difficult to pass a thin paper having low rigidity or other types of paper.

SUMMARY

It is therefore an object of the present invention to provide a paper thickness detecting device, capable of detecting the paper thickness with high accuracy without deteriorating productivity, and an image forming apparatus including the paper thickness detecting device.

To achieve the abovementioned object, according to an aspect of the present invention, there is provided a paper thickness detecting device that detects a paper thickness in accordance with a detection signal of a displacement sensor, and the paper thickness detecting device reflecting one aspect of the present invention comprises: a pair of paper thickness detecting rollers comprising a first roller and a second roller that pinch a paper conveyed via a pair of conveyance rollers; and the displacement sensor that detects a displacement amount of the pair of paper thickness detecting rollers at the time when the paper passes through the pair of paper thickness detecting rollers, wherein the paper thickness is detected on the basis of the displacement amount of the pair of paper thickness detecting rollers that follows to rotate with respect to the paper conveyed via the pair of conveyance rollers.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. The same reference is used for the same component, and redundant explanations will be omitted as appropriate.

Figure 1:
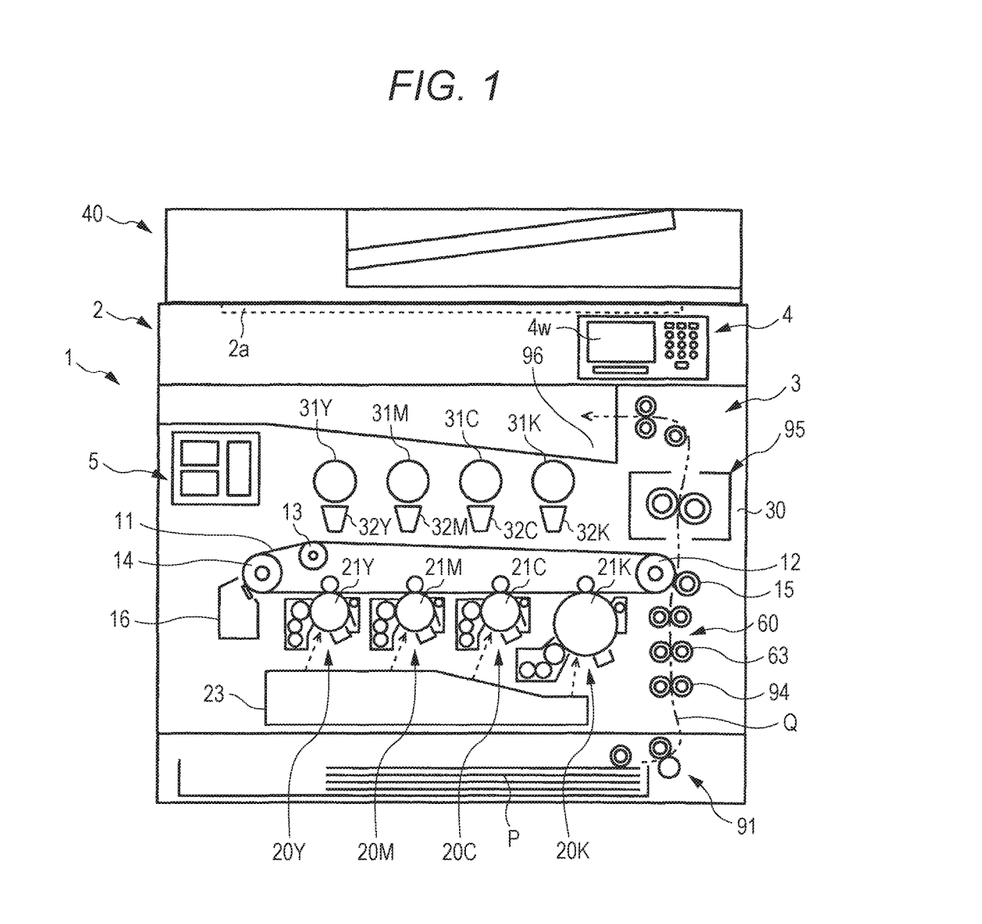
FIG. 1 is a partial vertical cross-sectional front view of an image forming apparatus according to an embodiment of the present invention.

First, an outline of a structure of the image forming apparatus according to an embodiment of the present invention will be described with reference to FIG. 1, and an image outputting operation will be described. FIG. 1 is an example of a partial vertical cross-sectional front view of the image forming apparatus. Note that a two-dot chain line with an arrow in FIG. 1 indicates a conveyance path and a conveyance direction of a paper. The vertical direction, the horizontal direction, and the depth direction on the paper face in FIG. 1 correspond to a vertical direction, a horizontal direction, and a depth direction, respectively, of the image forming apparatus.

As illustrated in FIG. 1, the image forming apparatus 1 is a so-called tandem type color copying machine, and includes an image reader 2 that reads an image of a document, a printer 3 that prints the read image on a transfer material such as a paper, an operator 4 for inputting printing conditions or displaying an operation status, and a main controller 5.

The image reader 2 is a known one that reads an image of a document placed on an upper surface of a platen glass 2a by moving a scanner (not illustrated). The image forming apparatus 1 further includes a document conveying device 40 which is a paper conveying device. It is also possible to automatically read images of a document of a plurality of pages one by one by using the document conveying device 40 and the image reader 2. An image of a document is separated into three colors of red (R), green (G), and blue (B), which are then converted into electric signals by a charge coupled device (CCD) image sensor (not illustrated). As a result, the image reader 2 obtains image data of each of the colors of red (R), green (G), and blue (B).

The image data of each of the colors obtained by the image reader 2 from the document is subjected to various types of processing in the main controller 5 and then converted into image data of each of reproduction colors of yellow (Y), magenta (M), cyan (C), and black (K) to be stored in a memory (not illustrated) of the main controller 5. The image data of each of the reproduction colors stored in the memory is subjected to processing for correction of misalignment, and then is read by each scanning line in synchronization with conveyance of a paper in order to perform optical scanning on a photoreceptor drum 21 which is an image carrier.

The printer 3 forms an image by an electrophotographic method and transfers the image to the paper for printing. The printer 3 includes an intermediate transfer belt 11 in which an intermediate transfer body is formed as an endless belt. The intermediate transfer belt 11 is wound around a driving roller 12 and following rollers 13 and 14. The intermediate transfer belt 11 is caused to rotate counterclockwise in FIG. 1 by the driving roller 12.

The driving roller 12 contacts and presses against a secondary transfer roller 15 opposing thereto with the intermediate transfer belt 11 interposed therebetween. At a position of the following roller 14, an intermediate transfer cleaner 16 arranged to be opposite to the following roller 14 with the intermediate transfer belt 11 interposed therebetween comes into contact with an outer circumferential surface of the intermediate transfer belt 11. After a toner image formed on the outer circumferential surface of the intermediate transfer belt 11 is transferred onto the paper, the intermediate transfer cleaner 16 performs cleaning by removing attached matters such as toner remaining on the outer circumferential surface of the intermediate transfer belt 11.

Image formers 20Y, 20M, 20C, and 20K corresponding to the reproduction colors of yellow (Y), magenta (M), cyan (C), and black (K), respectively, are provided under the intermediate transfer belt 11. Note that in this explanation they may be collectively referred to as, for example, the "image formers 20" by omitting identifying symbols of "Y", "M", "C", and "K" except for cases where it is particularly necessary to specify. The four image formers 20 are arranged in a row from the upstream side to the downstream side in the rotation direction along the rotation direction of the intermediate transfer belt 11. The four image formers 20 have entirely the same structure. With the photoreceptor drum 21 rotating clockwise in FIG. 1 disposed in the center, a charger, an exposurer (exposure device 23), a developer, a drum cleaner, and a primary transfer roller are disposed therearound.

Above the intermediate transfer belt 11, four toner bottles 31 and four toner hoppers 32 each corresponding to one of the four image formers 20 of the respective reproduction colors are provided. A remaining amount detector (not illustrated) that detects the remaining amount of toner inside one of the developers or one of the toner hoppers 32 is included in each of the developers and the toner hoppers 32. Between a developer and a toner hopper 32 and between a toner hopper 32 and a toner bottle 31, a toner replenisher (not illustrated) is provided. When the remaining amount detector detects a decrease in the remaining amount of toner inside the developer, the replenisher drives the toner hopper 32 to replenish the toner to the developer. Furthermore, when the remaining amount detector detects a decrease in the remaining amount of toner inside the toner hopper 32, the replenisher drives the toner bottle 31 to replenish toner to the toner hopper 32. The toner bottle 31 is attachably and detachably included in a main body of the apparatus and can be replaced with a new one as appropriate.

The exposure device 23, which is an exposurer, is arranged below the image formers 20. The single exposure device 23 works with the four image formers 20 and has four light sources such as a semiconductor laser (not illustrated) each separately corresponding to one of the four photoreceptor drums 21. The exposure device 23 modulates the four semiconductor lasers in accordance with image gradation data of each of the reproduction colors and separately emits a laser light corresponding to each of the reproduction colors to each of the four photoreceptor drums 21.

A paper supply device 91 is provided below the exposure device 23. The paper supply device 91 accommodates a plurality of papers P therein in a stacked manner and sequentially feeds the papers P one by one to the paper conveyance path Q from the uppermost layer of a bundle of the papers. A paper P fed from the paper supply device 91 to the paper conveyance path Q reaches a position of a pair of registration rollers 94. The pair of registration rollers 94 synchronizes with the rotation of the intermediate transfer belt 11, while correcting skew feeding of the paper P (skew correction), and feeds the paper P toward a contacting part of the intermediate transfer belt 11 and the secondary transfer roller 15 (secondary transfer nip part).

In the image former 20, an electrostatic latent image is formed on a surface of the photoreceptor drum 21 by a laser light irradiated from the exposure device 23, and the electrostatic latent image is visualized as a toner image by the developer. The toner image formed on the surface of the photoreceptor drum 21 is primarily transferred to the outer circumferential surface of the intermediate transfer belt 11 at a position where the photoreceptor drum 21 faces the primary transfer roller with the intermediate transfer belt 11 interposed therebetween. As the intermediate transfer belt 11 rotates, toner images of the respective image formers 20 are sequentially transferred onto the intermediate transfer belt 11 at predetermined timings, whereby a color toner image (printed image) in which toner images of the four colors of yellow, magenta, cyan, and black are superimposed is formed on the outer circumferential surface of the intermediate transfer belt 11.

The color toner image primarily transferred to the outer circumferential surface of the intermediate transfer belt 11 is transferred to the paper P fed in synchronization by the pair of registration rollers 94 at the secondary transfer nip part formed by bringing the intermediate transfer belt 11 and the secondary transfer roller 15 into contact.

A fixer 95 is provided above the secondary transfer nip part. The paper P to which the unfixed toner image has been transferred at the secondary transfer nip part is fed to the fixer 95, whereat and the toner image is heated and pressed to be fixed on the paper P. The paper P having passed through the fixer 95 is ejected to a paper ejector 96 provided above the intermediate transfer belt 11.

The operator 4 is included on a front side of an upper part of the image forming apparatus 1. The operator 4 includes a display 4w having a touch panel. The operator 4 accepts an input of settings by a user such as printing conditions such as the type and the size of a paper P used for printing, enlargement/reduction, whether double-sided printing is performed and an input of settings such as a fax number and a name of a sender in facsimile transmission. In addition, the operator 4 also functions as an informer for informing the user of, for example the status of the apparatus, notes, error messages, or other information by displaying them on the display 4w.

The image forming apparatus 1 includes the main controller 5 including a CPU (not illustrated), an image processor, and other electronic components (not illustrated) for control the overall operation thereof. The main controller 5 uses the CPU that is a central processing unit and the image processor to control components such as the image reader 2, the document conveying device 40, and the printer 3 on the basis of a program and data stored in or input to the memory and implement the series of image forming operation and printing operation.

Figure 2:
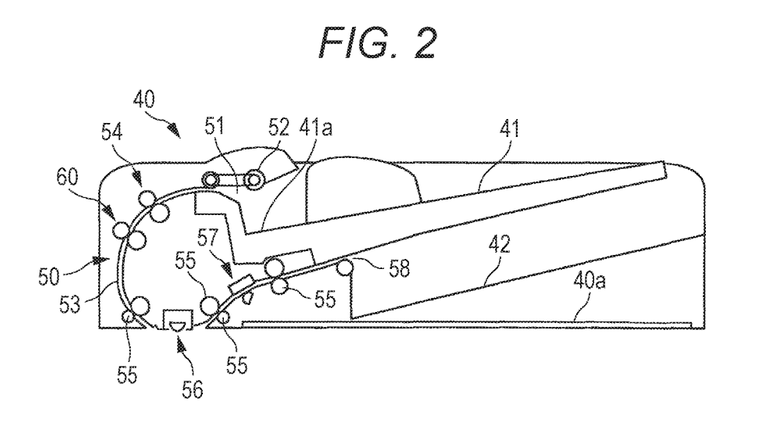
FIG. 2 is a vertical cross-sectional front view of a document conveying device of the image forming apparatus illustrated in FIG. 1.

Next, a structure and operation of the document conveying device 40 of the image forming apparatus 1 will be described with reference to FIG. 2 in addition to FIG. 1. FIG. 2 is a vertical cross-sectional front view of the document conveying device 40. Note that the vertical direction, the horizontal direction, and the depth direction on the paper face in FIG. 2 correspond to a vertical direction, a horizontal direction, and a longitudinal direction, respectively, of the image forming apparatus 1 and the document conveying device 40.

The document conveying device 40 is provided on the platen glass 2a to be opposed to face the platen glass 2a as illustrated in FIG. 1. The document conveying device 40 has a substantially rectangular parallelepiped shape covering the entire surface of the platen glass 2a.

The document conveying device 40 is attached to the main body of the image forming apparatus 1 in a swingable manner around two spindles (not illustrated), extending substantially horizontally in the horizontal direction, provided on the back side of the image reader 2. This allows the document conveying device 40 to swing up and down with its front side part being a free end, thereby allowing the surface of the platen glass 2a to be open and shut.

As illustrated in FIG. 2, the document conveying device 40 includes a document mat 40a on a lower surface thereof. One side of the document mat 40a serves as a background of a document facing the platen glass 2a. The document mat 40a includes an elastic member such as a sponge and has a white surface. The document mat 40a is positioned and sized to cover the entire area of the platen glass 2a. When the surface of the platen glass 2a is shut by the document conveying device 40, the document mat 40a presses against a document placed on the platen glass 2a from above and closely contacts the entire surface of the document by uniformly applying pressure thereto to hold the document while preventing the document from moving.

In addition to the document mat 40a, the document conveying device 40 includes a paper feed tray 41, a document conveyor 50, and a paper ejecting tray 42.

The paper feed tray 41 is a part, for placing a document thereon, positioned in an upper part of the document conveying device 40. Documents can be placed on the paper feed tray 41 from above to be stacked therein. The paper feed tray 41 has an inclination that descends from the upstream side toward the downstream side in the document conveyance direction, that is, from the right side to the left side in FIG. 2.

A lifter 41a for a document is included in a downstream part of the paper feed tray 41 in the document conveyance direction. The lifter 41a has a shape along a placement surface of the paper feed tray 41 and is rotatable on a vertical plane about a spindle (not illustrated), included at an upstream end thereof, extending in a document width direction which is a direction intersecting with the document conveyance direction, with a downstream end thereof being as a free end. When a document is supplied, the lifter 41a is rotated about the spindle by a motor or the like (not illustrated). As a result, a downstream end of a document stacked on the paper feed tray 41 is energized upward to come into contact with a feed roller 52 arranged above.

The document conveyor 50 includes a document feed port 51 and the feed roller 52 at a downstream end of the paper feed tray 41 in the document conveyance direction. The feed roller 52 separates the documents stacked on the paper feed tray 41 one by one from the uppermost layer, supplies the document to the inside of the document conveyor 50, and conveys the document. On the downstream side of the document feed port 51, a document conveyance path 53 extends toward the inside of the document conveyor 50.

A pair of registration rollers 54 is included in the document conveyance path 53. The pair of registration rollers 54 corrects skew feeding of a document (skew correction) and then feeds the document further downstream in the conveyance direction. In addition, conveyance rollers 55 are included at various places of the document conveyance path 53.

A downstream side of the pair of registration rollers 54 of the document conveyance path 53 in the document conveyance direction reaches a bottom surface of the document conveying device 40, whereat a first document reader 56 is included. The document fed to the first document reader 56 moves further downstream on the document conveyance path 53, that is, from left to right through a position of the first document reader 56 in FIG. 2. During this, image data of a first surface which is a lower side is read by the image reader 2 of the main body of the image forming apparatus 1 provided thereunder.

A second document reader 57 is included downstream the first document reader 56 in the document conveyance direction of the document conveyance path 53. When it is necessary to read image data on both sides of the document, the document fed to the second document reader 57 moves further downstream on the document conveyance path 53, that is, from left to right through a position of the second document reader 57 in FIG. 2. During this, image data of a second surface which is an upper side is read by the second document reader 57 provided thereabove.

A document ejecting port 58 is included at a downstream end of the document conveyance path 53. The document the image data of which has been read is ejected from the document ejecting port 58 to the paper ejecting tray 42. The paper ejecting tray 42 is included immediately below the paper feed tray 41, and these trays form two levels of an upper level and a lower level. The document ejected onto the paper ejecting tray 42 can be taken out from the front side of the document conveying device 40.

The paper feed tray 41 and the paper ejecting tray 42 each have a document conveyance direction opposite to the other, that is, in FIG. 2, the paper feed tray 41 feeds a document to the left, and the paper ejecting tray 42 receives the document from the left. As a result, as illustrated in FIG. 2, the document conveyance path 53 extending from the document feed port 51 to the document ejecting port 58 is arranged in a curved U-letter shape inclined in the lateral direction.

With the above structure, the document conveying device 40 separates the documents placed on the paper feed tray 41 one by one, supplies the document to the inside of the document conveyor 50, reads image data of the document by the first document reader 56 and the second document reader 57, and then ejects the document to the paper ejecting tray 42.

In the present embodiment, in order to detect the thickness of a paper P, a paper thickness detecting device 60 is included in a downstream side of the pair of registration rollers 94 in the document conveyance direction. Furthermore, in order to detect the thickness of a document conveyed by the document conveying device 40, the paper thickness detecting device 60 may be included on a downstream side of the pair of registration rollers 54 in the document conveyance direction.

Figure 3:
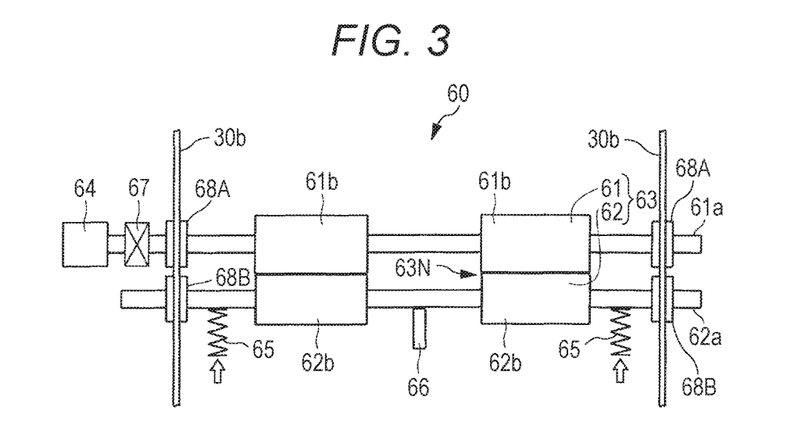
FIG. 3 is a schematic front view of a paper thickness detecting device according to an embodiment of the present invention.
Figure 4:
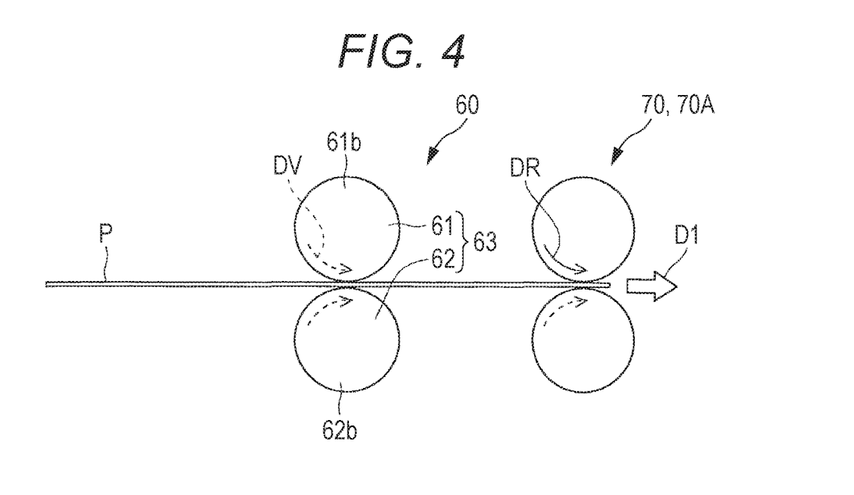
FIG. 4 is a side cross-sectional view of the paper thickness detecting device of a first embodiment.
Figure 5:
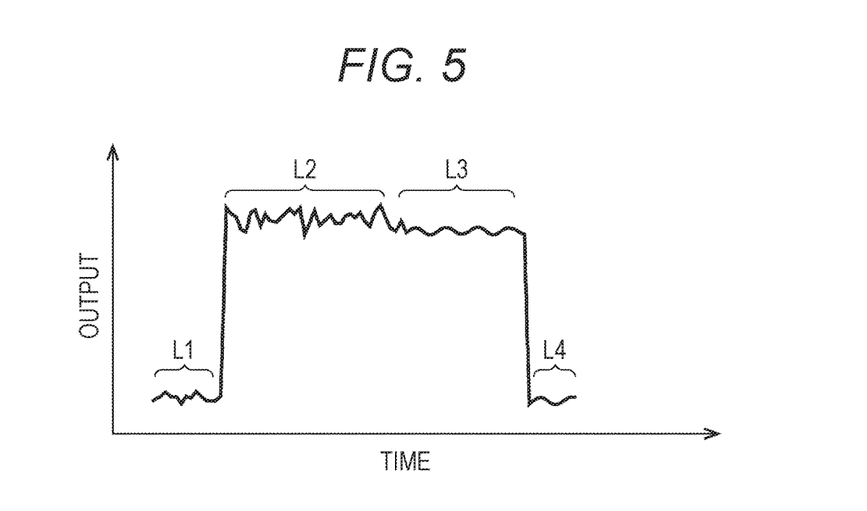
FIG. 5 is an example of an output of a displacement sensor of the paper thickness detecting device of the first embodiment.
Figure 6:
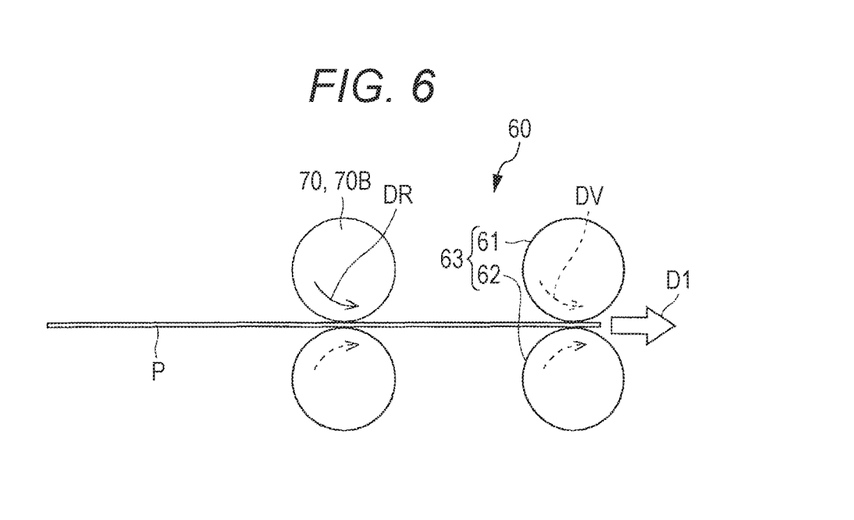
FIG. 6 is a side cross-sectional view of a paper thickness detecting device according to a second embodiment.

Next, a detailed structure and operations of the paper thickness detecting device 60 will be described. First, the paper thickness detecting device 60 according to an embodiment of the present invention will be described with reference to FIG. 3 to FIG. 6. FIG. 3 is a schematic front view of the paper thickness detecting device 60. FIG. 4 is a side cross-sectional view of the paper thickness detecting device 60 (60A) of the first embodiment, FIG. 5 is an example of output of the displacement sensor, and FIG. 6 is a cross-sectional view of a paper thickness detecting device 60 (60B) of a second embodiment.

The image forming apparatus 1 according to the present embodiment has a function of setting an image forming process such as optimal fixing temperature on the basis of paper type information set by a user. At this time, for a user who does not know the paper type to be printed, a paper thickness measurer is arranged in the middle of the paper passing path, and the paper thickness is measured by passing the set paper P. In the image forming apparatus 1, a paper thickness database for each paper type is mounted, and the paper type is specified by comparison with this information to perform discrimination of the paper type of the paper P.

As illustrated in FIG. 3, the paper thickness detecting device 60 according to this embodiment includes a pair of paper thickness detecting rollers 63 formed by a first roller 61 and a second roller 62, a motor 64, an energizing member 65, a displacement sensor 66. Furthermore, a switcher 67 (for example, an electromagnetic clutch) capable of switching the first roller 61 between a driving state and a following state is included.

The first roller 61 has a shaft part 61a extending along the longitudinal direction of the main body 30 of the apparatus including the printer 3. In the first roller 61, for example two roller parts 61b aligned along the axial direction are fixed to the common shaft part 61a. The material of the roller part 61b is for example ethylene-propylene-diene rubber (EPDM). Both end parts of the shaft part 61a in the axial direction are supported such that the shaft part 61a can rotate around the axis thereof via a bearing 68A fixed to the frame part 30b of the main body 30 of the apparatus.

The shaft part 61a of the first roller 61 is coupled to the motor 64 via the switcher 67. When the switcher 67 is in an ON state, the first roller 61 rotates by obtaining power from the motor 64. When the switcher 67 is in an OFF state, the first roller 61 becomes free and allowed to follow to rotate. Note that, as the motor 64, other motors included in the document conveyor 50 may be used together with the motor 64.

The second roller 62 has a shaft part 62a extending along the longitudinal direction of the document conveying device 40. In the second roller 62, for example two roller parts 62b aligned along the axial direction are fixed to the common shaft part 62a. The material of the roller part 62b is, for example, polyacetal (POM). Both end parts of the shaft part 62a in the axial direction are supported such that the shaft part 62a can rotate around the axis thereof via a bearing 68B included in the frame part 30b of the main body 30 of the apparatus.

The bearing 68B can be relatively displaced with respect to the frame part 30b in directions in which the second roller 62 approaches or separates from the first roller 61. The second roller 62 is energized by the energizing member 65 in a direction intersecting with the axial direction to approach the first roller 61. As a result, circumferential surfaces of the roller parts 61b and 62b of the first roller 61 and the second roller 62 are opposed to each other and presses against the other, and thus the first roller 61 and the second roller 62 form a nip part 63N through which a paper P passes. The second roller 62 rotates in accordance with rotation of the first roller 61 by being in contact with the first roller 61 driven to rotate.

The displacement sensor 66 is arranged adjacent to the shaft part 62a of the second roller 62. The displacement sensor 66 has a contact type displacement sensor utilizing, for example, a strain gauge and contacts the shaft part 62a of the second roller 62 to detect the displacement of the shaft part 62a.

<First Embodiment>

FIG. 4 is a side view of the paper thickness detecting device 60 according to the first embodiment. The paper thickness detecting device 60 performs paper thickness detection in cooperation with a pair of conveyance rollers 70 (pair of lower conveyance rollers 70A) included in the downstream side of the pair of paper thickness detecting rollers 63. In this structure, after the paper P has entered the pair of lower conveyance rollers 70A on a downstream side of the pair of paper thickness detecting rollers 63, the pair of paper thickness detecting rollers 63 is caused to be in a following rotating state and to be idly rotated. Then, the thickness of the paper P is calculated on the basis of the data of the displacement sensor 66 after an elapse of a predetermined time (for example, 0.1 seconds) after the idle rotation. A method of detecting the timing at which the paper P enters the pair of lower conveyance rollers 70A may be a conventionally known method and is not particularly limited.

Even when the pair of paper thickness detecting rollers 63 is idly rotated, the pair of paper thickness detecting rollers 63 is subjected to following rotation by the paper P conveyed by the pair of lower conveyance rollers 70A driven to rotate. That is, the pair of lower conveyance rollers 70A is driven to rotate while the pair of paper thickness detecting rollers 63 is subjected to following rotation. A solid line rotating arrow DR illustrated in FIG. 4 represents the driving rotation state, and a broken line rotating arrow DV represents the following rotating state. At this time, the shaft part 62a is displaced by an amount corresponding to the paper thickness of the paper P pinched by the roller part 61b and the roller part 62b.

FIG. 5 illustrates an example of an output of the displacement sensor 66 based on the structure of FIG. 3. It can be seen that the output of the sensor is divided into four regions of region L1, region L2, region L3, and region L4. The region L1 represents a state before the paper P enters the nip part 63N and indicates the basic vibration component in the driving state. The region L2 represents a state where the pair of paper thickness detecting rollers 63 pinching the paper P is driven to rotate and includes a paper thickness component and the vibration component in the driving state. The region L3 represents a state after the pair of paper thickness detecting rollers 63 pinching the paper P is idly rotated and indicates a state where the vibration component in the driving state is attenuated. The region L4 represents a state after the paper P has passed through the pair of paper thickness detecting rollers 63 and indicates a vibration component in the following state.

As illustrated in FIG. 5, it can be seen that the fluctuation of data of the displacement sensor 66 is large in the region L2 in which the first roller 61 is driven to rotate and that the fluctuation of data of the displacement sensor 66 is small with attenuating vibration in the region L3 in which the first roller 61 is subjected to following rotation.

That is, in a state after the paper P is pinched and the pair of paper thickness detecting rollers 63 is cause to idle during conveyance, the first roller 61 becomes free, and thus driving noise such as vibration of the motors in the paper thickness detection direction can be canceled. Therefore, only an eccentricity component of the pair of rollers is included in the fluctuation factor. Thus, information on the paper thickness calculated on the basis of data of the displacement sensor 66 after the vibration detected by the displacement sensor 66 has been attenuated becomes more accurate, enabling highly accurate determination of the paper type.

<Second Embodiment>

Alternatively, the pair of conveyance rollers 70 may be included on an upstream side of the pair of paper thickness detecting rollers 63 used thereat. Therefore, an embodiment in which paper thickness detection is performed in cooperation with a pair of upper conveyance rollers 70B included on the upstream side of the pair of paper thickness detecting rollers 63 will be described with reference to FIG. 6 as a second embodiment. FIG. 6 is a side cross-sectional view of the paper thickness detecting device 60 of the second embodiment.

In the second embodiment, as illustrated in FIG. 6, after a paper P conveyed by the pair of upper conveyance rollers 70B on the upstream side has entered a nip part 63N (illustrated in FIG. 3) of a pair of paper thickness detecting rollers 63, the pair of paper thickness detecting rollers 63 is subjected to following rotation. Information on the thickness of the paper P is calculated on the basis of the data of the displacement sensor after this idling. A method of detecting the timing at which the paper P enters the nip part 63N of the pair of paper thickness detecting rollers 63 may also be a conventionally known method and is not particularly limited.

In the present embodiment, after the paper P has entered the nip part 63N of the pair of paper thickness detecting rollers 63, the pair of paper thickness detecting rollers 63 (paper thickness detector) is subjected to following rotation to allow the pair of paper thickness detecting rollers 63 to idle. Thereafter, the paper thickness is calculated on the basis of a measurement value of the displacement sensor 66. As a result, it is possible to obtain a measurement value of the paper thickness that is more stable and more accurate than before, and at the same time, to improve the performance of passing a thin paper and the like.

An output of the displacement sensor 66 in the present embodiment has the same tendency as that of the output illustrated in FIG. 5 since the pair of paper thickness detecting rollers 63 is in the driving state when the paper P enters the nip part 63N, and after the paper P has entered the nip part 63N (for example, 0.1 seconds later), the pair of paper thickness detecting rollers 63 is switched to the following state.

In the first and the second embodiments described above, since the pair of paper thickness detecting rollers 63 is in the driving state when the paper P enters the nip part 63N, the conveyance resistance at the time of entering the nip part 63N does not become large, thereby enabling easily passing a thin paper or the like having low rigidity. Moreover, since the pair of paper thickness detecting rollers 63 is switched to the following state after the paper P has entered the nip part 63N to detect the paper thickness, it is possible to detect the paper thickness with high accuracy without stopping conveyance of the paper P.

Furthermore, at the time of detecting the paper thickness, it is preferable that the paper P does not straddle any other rollers than the pair of paper thickness detecting rollers 63 and the pair of lower conveyance rollers 70A or than the pair of paper thickness detecting rollers 63 and the pair of upper conveyance rollers 70B. This this structure, it is possible to suppress influences of vibrations, noises, and the like caused by other pairs of conveyance rollers, thereby enabling highly accurate detection of the paper thickness.

As described above, at the time of detecting the paper thickness, it is preferable that the paper P straddles only the pair of paper thickness detecting rollers 63 and the single pair of conveyance rollers 70. In the first embodiment, the paper P does not straddle any other rollers than the pair of paper thickness detecting rollers 63 and the pair of lower conveyance rollers 70A at the time of detecting the paper thickness. In the second embodiment, the paper P does not straddle any other rollers than the pair of upper conveyance rollers 70B and the pair of paper thickness detecting rollers 63 at the time of detecting the paper thickness. That is, it is preferable that the paper thickness detection has been already completed by the time when the paper P is pinched by another pair of conveyance rollers. As a result, driving noise of other pairs of conveyance rollers is not weighted, thereby enabling more accurate detection of the paper thickness.

<Third Embodiment>

Since there is vibration (noise caused by rotational deflection) when the pair of paper thickness detecting rollers 63 is in the following state, which corresponds to the region L4 illustrated in FIG. 5 even in the case of using the pair of lower conveyance rollers 70A or using the pair of upper conveyance rollers 70B as the pair of conveyance rollers 70, an embodiment in which this noise is suppressed will be described with reference to FIG. 7 as a third embodiment.

Since it is assumed that a vibration component illustrated in the region L4 of FIG. 5 is caused by an eccentricity component of the pair of rollers, in this embodiment, as a paper thickness measuring range, the paper thickness is calculated on the basis of a detection result of at least one or more cycles of a detection roller that is displaced (second roller 62) out of the pair of paper thickness detecting rollers 63 in order to suppress the eccentricity component.

Figure 7:
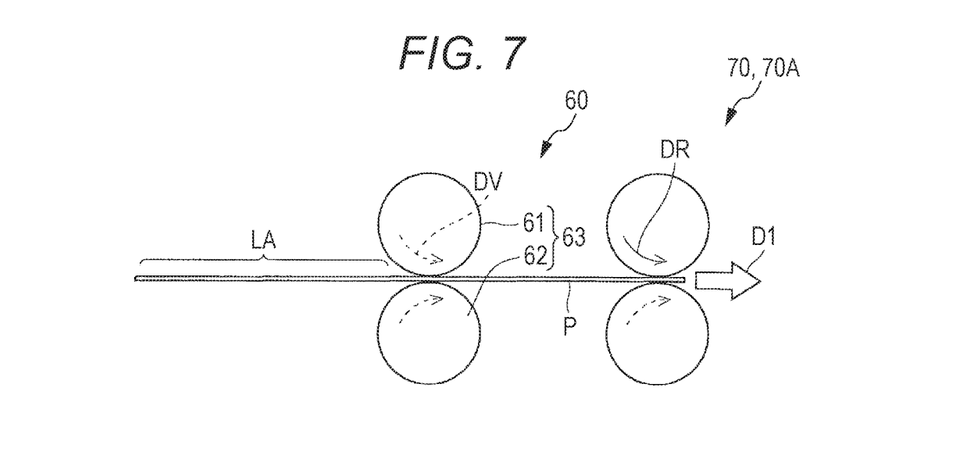
FIG. 7 is a side cross-sectional view of a paper thickness detecting device according to a third embodiment.

For example, as illustrated in FIG. 7, when paper thickness detection starts from a state where the paper P is pinched by the pair of paper thickness detecting rollers 63 and the pair of lower conveyance rollers 70A, a paper length LA on an upstream side of the pair of paper thickness detecting rollers 63 corresponds to the paper thickness measuring range. Therefore, it is preferable that the paper length LA is set to be a length of one or more cycles of the roller part 62b of the second roller 62 corresponding to the detecting roller that is displaced.

The above structure is preferable since fluctuation components for one cycle of the roller can be averaged and thus paper thickness detection with high accuracy is enabled.

In a case where the pair of paper thickness detecting rollers 63 idles after the paper P passes through the pair of paper thickness detecting rollers 63 at this time, by using data of the displacement sensor 66 after the pair of paper thickness detecting rollers 63 enters the idle rotation state, more accurate detection of the paper thickness is enabled. For example, it is possible to more accurately calculate the paper thickness on the basis of paper thickness data in the region L3 illustrated in FIG. 5 and noise data illustrated in the region L4.

Although the displacement sensor 66 detects the displacement of the shaft part 62a of the detecting roller (the second roller 62) that is displaced out of the pair of paper thickness detecting rollers 63, the displacement sensor 66 actually detects the displacement in which vibration caused by rotation of the first roller 61 and vibration caused by rotation of the second roller 62 are superimposed. Therefore, by performing calculation processing using the data of the region L4 corresponding to these fluctuation components as noise, more accurate detection of the paper thickness is enabled.

That is, it is preferable that, at the time of detecting the paper thickness, the paper thickness detecting device 60 according to the present embodiment calculates the paper thickness on the basis of data of the displacement sensor 66 after attenuation of the fluctuation components caused by vibrations such as the eccentricity of the rollers attenuate, that is, data of the displacement sensor 66 after vibration detected by the displacement sensor 66 has been attenuated. Furthermore, at the time of detecting the paper thickness, it is preferable that data of the displacement sensor 66 is recorded a plurality of times, and the paper thickness is calculated on the basis of an average thereof.

<Fourth Embodiment>

In order to remove the vibration component of the pair of paper thickness detecting rollers 63 as noise, it is preferable that the pair of paper thickness detecting rollers 63 idles for one or more cycles after the paper P has passed through the pair of paper thickness detecting rollers 63. Therefore, an embodiment that enables this will be described with reference to FIG. 8 as a fourth embodiment.

Figure 8:
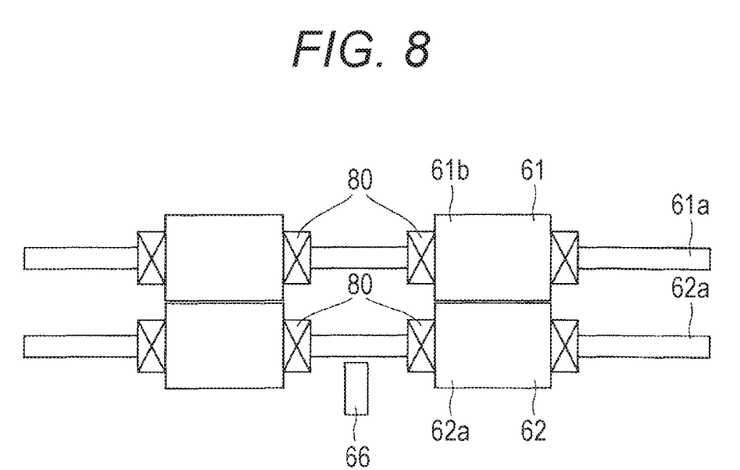
FIG. 8 is a side cross-sectional view of a paper thickness detecting device of a fourth embodiment.

FIG. 8 is a side cross-sectional view of a paper thickness detecting device of the fourth embodiment, in which flywheels 80 are attached to a first roller 61 and a second roller 62 of a pair of paper thickness detecting rollers 63. The flywheel 80 has a function of exerting inertial force by which the second roller 62, which is a detecting roller that is displaced, idles for one or more cycles after the paper P has passed through the pair of paper thickness detecting rollers 63.

If the diameter of the first roller 61 and the second roller 62 are the same, by attaching similar flywheels 80, the first roller 61 and the second roller 62 can be caused to idle for one or more cycles.

According to the present embodiment in which the flywheels 80 are attached, the pair of paper thickness detecting rollers 63 can idle for one or more cycles after the paper P passes through the pair of paper thickness detecting rollers 63, and thus the vibration component (rotational deflection) of the pair of paper thickness detecting rollers 63 at the time of following rotation can be removed by calculation as noise. Therefore, it becomes possible to detect more accurate paper thickness.

Figure 9:
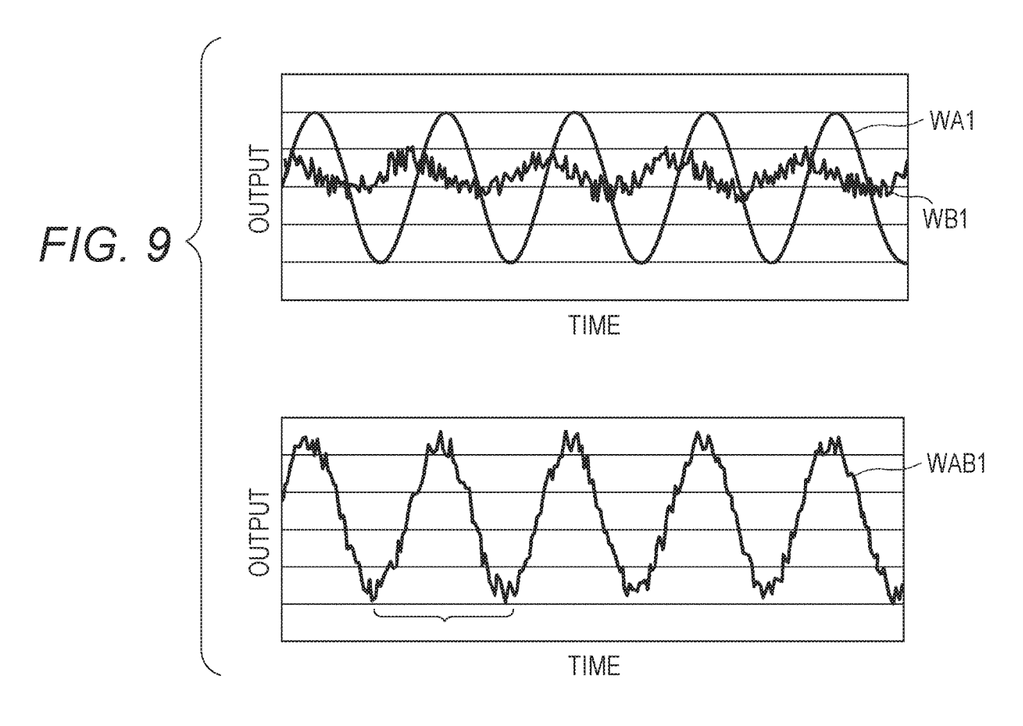
FIG. 9 includes graphs illustrating output data and composite data at the time of detecting the paper thickness in a case where a paper thickness detecting roller and a conveyance roller have the same diameter.
Figure 10:
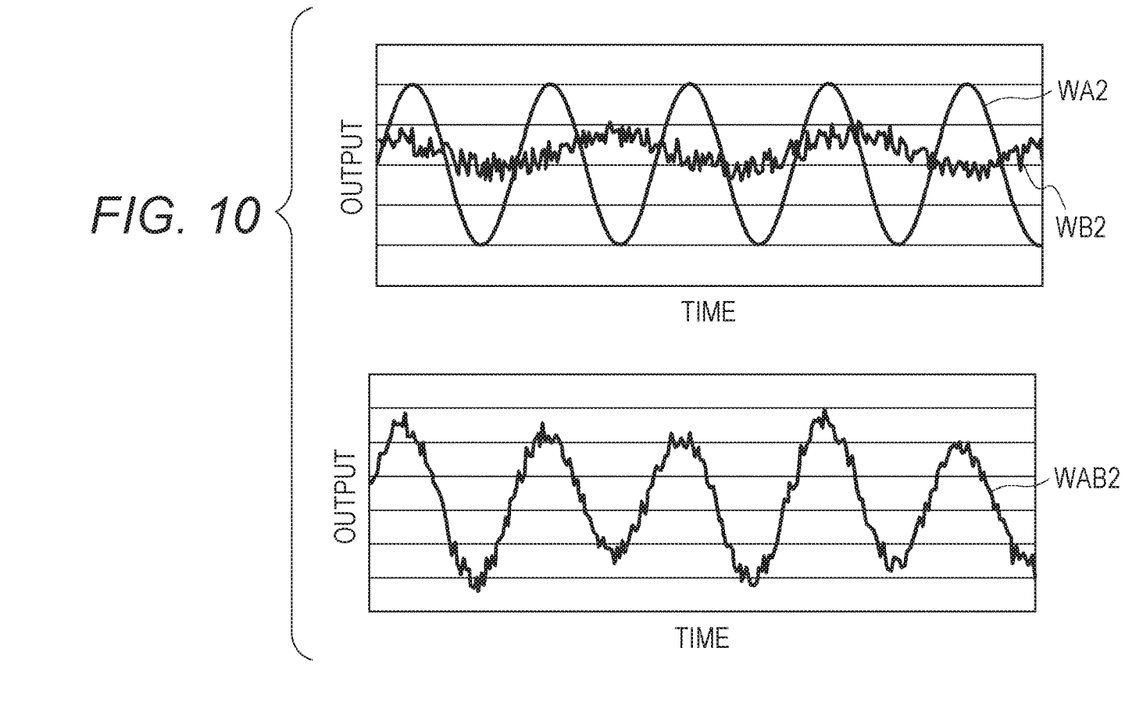
FIG. 10 is a graph illustrating output data and composite data at the time of detecting a paper thickness in a case where a paper thickness detecting roller and a conveyance roller have different diameters.

Next, with reference to FIG. 9 and FIG. 10, the vibration component of the pair of paper thickness detecting rollers 63 that results in as noise will be described. In each roller (the first roller 61 and the second roller 62) of the pair of paper thickness detecting rollers 63, the roller part 61b or the roller part 62b has its own eccentricity with respect to a rotation center thereof, and vibration (rotational deflection) is caused by the eccentricity. FIG. 9 includes graphs illustrating output data and composite data at the time of detecting the paper thickness in a case where a paper thickness detecting roller and a conveyance roller have the same diameter. FIG. 10 includes graphs illustrating output data and composite data at the time of detecting the paper thickness in a case where a paper thickness detecting roller and a conveyance roller have different diameters.

As illustrated in FIG. 9, when a paper thickness detecting roller and a conveyance roller have the same diameter, output data of a waveform WA1 caused by the eccentricity component of the paper thickness detecting roller and a waveform WB1 including the driving noise component and the eccentricity component of the conveyance roller is illustrated. Furthermore, a composite waveform WAB1 in which the waveform WA1 and the waveform WB1 are superimposed is detected as composite data.

As illustrated in FIG. 10, when a paper thickness detecting roller and a conveyance roller have different diameters, output data of a waveform WA2 caused by the eccentricity component of the paper thickness detecting roller and a waveform WB2 including the driving noise component and the eccentricity component of the conveyance roller is illustrated. Furthermore, a composite waveform WAB2 in which the waveform WA2 and the waveform WB2 are superimposed is detected as composite data.

The composite waveform WAB1 illustrates an output form in which noise is included in a simple waveform with stable cycles, thus indicating that it is easy to perform calculations such as removing noise components. On the other hand, it is shown that cycles of the composite waveform WAB2 is unstable and that calculation at the time of removing noise is not easy. That is, since the composite waveform WAB1 in the case where diameters of a paper thickness detecting roller and a conveyance roller are the same represents a simple waveform with stable cycles, averaging processing and noise removal processing can be easily performed by acquiring data for one cycle of the paper thickness detecting roller.

Therefore, it is preferable that diameters of the pair of paper thickness detecting rollers 63 and the pair of conveyance rollers 70 are the same. Since the pair of paper thickness detecting rollers 63 has the upper and the lower rollers (the roller part 61*b* and the roller part 62*b*) and the pair of conveyance rollers 70 also has the upper and the lower rollers, meaning of that diameters of rollers are the same includes a case where diameters of all of these rollers are the same as well as a case where diameters of at least the upper rollers and the lower rollers are the same.

That is, by allowing the diameters of the upper and the lower rollers of the pair of paper thickness detecting rollers 63 and the pair of conveyance rollers 70 to be the same at least between the upper rollers or the lower rollers, averaging processing and noise removal processing of data of the displacement sensor 66 can be easily performed, thereby enabling more accurate detection of the paper thickness.

Although the embodiments of the present invention have been described above, the scope of the present invention is not limited thereto, and implementation can be made with various modifications without departing from the principals of the invention. For example, it has been described that the first roller 61 of the pair of paper thickness detecting rollers 63 is used as a driving roller, the switcher 67 and the motor 64 are coupled to the shaft part 61*a* of the first roller 61, and the displacement of the shaft part 62*a* of the second roller 62 is detected; however, the second roller 62 may be a driving roller, the switcher 67 and the motor 64 may be coupled to the shaft part 62*a* of the second roller 62, and the displacement of the shaft part 61*a* of the first roller 61 may be detected. Furthermore, the paper thickness detecting device 60 may be mounted on the document conveying device 40 and used for detecting the thickness of a document an image of which is to be read.

As described above, an embodiment of the present invention is a paper thickness detecting device 60 that detects a paper thickness in accordance with a detection signal of a displacement sensor 66, the paper thickness detecting device, including: a pair of paper thickness detecting rollers 63 including a first roller 61 and a second roller 62 that pinch a paper P conveyed via a pair of conveyance rollers 70; and the displacement sensor 66 that detects a displacement amount of the pair of paper thickness detecting rollers 63 at the time when the paper P passes through the pair of paper thickness detecting rollers 63, in which the paper thickness is detected on the basis of the displacement amount of the pair of paper thickness detecting rollers 63 that follows to rotate with respect to the paper P conveyed via the pair of conveyance rollers 70.

According to the above configuration, since the pair of paper thickness detecting rollers 63 is subjected to following rotation after a paper P is conveyed to the nip part 63N of the pair of paper thickness detecting rollers 63 without stopping conveyance of the paper P, the performance of passing a paper such as a thin paper is not affected, and a stable and highly accuracy paper thickness measurement value can be obtained without deteriorating productivity. Therefore, it is possible to obtain the paper thickness detecting device 60 capable of detecting the paper thickness with high accuracy without deteriorating productivity.

In the paper thickness detecting device 60 of the above configuration of an embodiment of the present invention, the pair of paper thickness detecting rollers 63 can be switched between the driving rotation in which one of the first roller 61 and the second roller 62 is set as a driving roller while the other is set as a following roller and the following rotation in which both of the first roller 61 and the second roller 62 are allowed to follow to rotate. This structure enables conveyance of the paper P by driving rotation and detection of the paper thickness with high accuracy by following rotation.

An embodiment of the present invention is the paper thickness detecting device 60 of the above structure, further including: a switcher 67 that switches the pair of paper thickness detecting rollers 63 between a driving state where rotational driving force is applied and a following state where no rotational driving force is applied, in which, in the following state, the driving roller is allowed to idle via the switcher 67. This configuration enables easily switching the driving rotation and the following rotation of the pair of paper thickness detecting rollers 63.

Furthermore in the paper thickness detecting device 60 of the above configuration of an embodiment of the present invention, the pair of lower conveyance rollers 70A is included on the downstream side as the pair of conveyance rollers 70, and after a paper P has entered the pair of lower conveyance rollers 70A, the pair of paper thickness detecting rollers 63 is switched from the driving state to the following state to perform paper thickness detection. According to this configuration, even when the pair of paper thickness detecting rollers 63 is switched from the driving state to the following state, the paper P can be ensured to be conveyed by the pair of lower conveyance rollers 70A. Thus, the paper thickness can be highly accurately detected by the pair of paper thickness detecting rollers 63 that is subjected to the following rotation.

Furthermore in the paper thickness detecting device 60 of the above configuration of an embodiment of the present invention, the pair of upper conveyance rollers 70B is included on the upstream side as the pair of conveyance rollers 70, and after a paper P has entered the pair of paper thickness detecting rollers 63 from the pair of upper conveyance rollers 70B, the pair of paper thickness detecting rollers 63 is switched from the driving state to the following state to perform paper thickness detection. According to this configuration, even when the pair of paper thickness detecting rollers 63 is switched from the driving state to the following state, the paper P can be ensured to be conveyed by the pair of upper conveyance rollers 70B. Thus, the paper thickness can be highly accurately detected by the pair of paper thickness detecting rollers 63 that is subjected to the following rotation.

Furthermore in the paper thickness detecting device 60 of the above configuration of an embodiment of the present invention, the pair of upper conveyance rollers 70B is included on the upstream side of the pair of paper thickness detecting rollers 63 as the pair of conveyance rollers 70, and the pair of lower conveyance rollers 70A is included on the downstream side. At the time of detecting the paper thickness, the paper P does not straddle any other rollers than the pair of paper thickness detecting rollers 63 and the pair of lower conveyance rollers 70A or than the pair of paper thickness detecting rollers 63 and the pair of upper conveyance rollers 70B. This this structure, it is possible to suppress influences of vibrations, noises, and the like caused by other pairs of conveyance rollers, thereby enabling highly accurate detection of the paper thickness.

Furthermore in the paper thickness detecting device 60 of the above configuration of an embodiment of the present invention, as a paper thickness measuring range, the paper thickness is calculated on the basis of a detection result of at least one or more cycles of a roller that is displaced out of the pair of paper thickness detecting rollers 63. According to this configuration, fluctuation components for one cycle of a roller can be easily averaged, thereby enabling highly accurate detection of the paper thickness.

Furthermore in the paper thickness detecting device 60 of the above configuration of an embodiment of the present invention, the paper thickness is calculated on the basis of data of the displacement sensor 66 at the time of detecting the paper thickness and data of the displacement sensor 66 at the time of idle rotation after the paper P has passed the pair of paper thickness detecting rollers 63. According to this configuration, it is possible to calculate and remove vibration components of the pair of paper thickness detecting rollers 63 as noise, thereby enabling highly accurate detection of the paper thickness.

Furthermore in the paper thickness detecting device 60 of the above configuration of an embodiment of the present invention, at the time of detecting the paper thickness, the paper thickness is calculated on the basis of data of the displacement sensor 66 after vibration detected by the displacement sensor 66 has been attenuated. According to this configuration, fluctuation components attributable to driving noise of the pair of conveyance rollers 70, vibration components of the pair of paper thickness detecting rollers 63, and the like can be suppressed, thereby enabling more accurate detection of the paper thickness.

Furthermore in the paper thickness detecting device 60 of the above configuration of an embodiment of the present invention, at the time of detecting the paper thickness, data of the displacement sensor 66 is recorded a plurality of times, and the paper thickness is calculated on the basis of an average thereof. According to this configuration, the influence of the fluctuation component can be suppressed by the averaging processing of data of the displacement sensor 66, thereby enabling more accurate detection of the paper thickness.

Furthermore, in the paper thickness detecting device 60 of the above configuration of an embodiment of the present invention, an electromagnetic clutch is included as the switcher 67, the driving roller is driven to rotate via the electromagnetic clutch, and, at the time of detecting the paper thickness, the driving roller idles by conveyance of the paper P by interrupting power to the electromagnetic clutch.

This configuration enables easily switching the driving rotation and the following rotation of the pair of paper thickness detecting rollers 63 via the electromagnetic clutch.

Furthermore, in the paper thickness detecting device 60 of the above configuration of an embodiment of the present invention, the flywheel 80 is provided on a roller of the pair of paper thickness detecting rollers 63 (the first roller 61 and the second roller 62) to allow a roller that is displaced (second roller 62) out of the pair of paper thickness detecting rollers 63 to rotate one or more revolutions by inertia after the paper P passes through the pair of paper thickness detecting rollers 63. According to this configuration, it is possible to calculate and remove vibration components of the pair of paper thickness detecting rollers 63 at the time of following rotation as noise, thereby enabling more accurate detection of the paper thickness.

Furthermore, in the paper thickness detecting device 60 of the above configuration of an embodiment of the present invention, diameters of the pair of paper thickness detecting rollers 63 and the pair of conveyance rollers 70 are the same. According to this configuration, output data of the displacement sensor 66 indicates a simple waveform with stable cycles, averaging processing and noise removal processing of data of the displacement sensor 66 can be easily performed, thereby enabling more accurate detection of the paper thickness.

That is, according to the embodiment of the present invention, it is possible to implement the paper thickness detecting device 60 capable of detecting the paper thickness with high accuracy without deteriorating productivity.

Further, according to the image forming apparatus 1 including the paper thickness detecting device 60 according to an embodiment of the present embodiment, it is possible to implement the image forming apparatus 1 capable of highly accurately detecting the paper thickness supplied to the image printer and outputting preferable image quality by appropriately tuning parameters such as the fixing temperature or transfer conditions in accordance with the paper thickness.

As described above, according to an embodiment of the present invention, it is possible to obtain a paper thickness detecting device, capable of detecting the paper thickness with high accuracy without deteriorating productivity, and an image forming apparatus including the paper thickness detecting device.

Therefore, the paper thickness detecting device according to an embodiment of the present invention can be suitably applied to an image forming apparatus or the like that prints an image on a paper.

Although embodiments of the present invention have been described and illustrated in detail, the disclosed embodiments are made for purposes of illustration and example only and not limitation. The scope of the present invention should be interpreted by terms of the appended claims.

What is claimed is:

1. A paper thickness detecting device that detects a paper thickness in accordance with a detection signal of a displacement sensor, the paper thickness detecting device, comprising:
a pair of paper thickness detecting rollers comprising a first roller and a second roller that pinch a paper conveyed via a pair of conveyance rollers; and
the displacement sensor that detects a displacement amount of the pair of paper thickness detecting rollers at the time when the paper passes through the pair of paper thickness detecting rollers, wherein the paper thickness is detected on the basis of the displacement amount of the pair of paper thickness detecting rollers that follows to rotate with respect to the paper conveyed via the pair of conveyance rollers;

wherein one or more operations characteristics of an image forming apparatus is changed as a result of the detection of the paper thickness; and wherein the pair of paper thickness detecting rollers can be switched between driving rotation in which one of the first roller and the second roller is set as a driving roller while the other one is set as a following roller and following rotation in which both of the first roller and the second roller are allowed to follow to rotate.

2. The paper thickness detecting device according to claim 1, further comprising:

a switcher that switches the pair of paper thickness detecting rollers between a driving state where rotational driving force is applied and a following state where no rotational driving force is applied, wherein, in the following state, the driving roller is allowed to idle via the switcher.

3. The paper thickness detecting device according to claim 2, wherein a pair of lower conveyance rollers is provided, as the pair of conveyance rollers, on a downstream side of the pair of paper thickness detecting rollers, and after the paper has entered the pair of lower conveyance rollers, the pair of paper thickness detecting rollers is switched from the driving state to the following state to detect the paper thickness.

4. The paper thickness detecting device according to claim 2, wherein a pair of upper conveyance rollers is provided, as the pair of conveyance rollers, on an upstream side of the pair of paper thickness detecting rollers, and after the paper has entered the pair of paper thickness detecting rollers from the pair of upper conveyance rollers, the pair of paper thickness detecting rollers is switched from the driving state to the following state to detect the paper thickness.

5. The paper thickness detecting device according to claim 2, wherein, as the pair of conveyance rollers, a pair of upper conveyance rollers is provided on an upstream side of the pair of paper thickness detecting rollers, and a pair of lower conveyance rollers is provided on a downstream side thereof, and at the time of detecting the paper thickness, the paper does not straddle any other rollers than the pair of paper thickness detecting rollers and the pair of lower conveyance rollers or than the pair of paper thickness detecting rollers and the pair of upper conveyance rollers.

6. The paper thickness detecting device according to claim 2, wherein, as a paper thickness measuring range, the paper thickness is calculated on the basis of a detection result of at least one or more cycles of a roller that is displaced out of the pair of paper thickness detecting rollers.

7. The paper thickness detecting device according to claim 2, wherein the paper thickness is calculated on the basis of data of the displacement sensor at the time of detecting the paper thickness and data of the displacement sensor at the time of idle rotation after the paper has passed the pair of paper thickness detecting rollers.

8. The paper thickness detecting device according to claim 2, wherein, at the time of detecting the paper thickness, the paper thickness is calculated on the basis of data of the displacement sensor after vibration detected by the displacement sensor has been attenuated.

9. The paper thickness detecting device according to claim 2, wherein, at the time of detecting the paper thickness, data of the displacement sensor is recorded a plurality of times, and the paper thickness is calculated on the basis of an average thereof.

10. The paper thickness detecting device according to claim 2, wherein an electromagnetic clutch is provided as the switcher, the driving roller is driven to rotate via the electromagnetic clutch, and at the time of detecting the paper thickness, the driving roller idles by conveyance of the paper by interrupting power to the electromagnetic clutch.

11. The paper thickness detecting device according to claim 1, wherein a flywheel is provided on a roller of the pair of paper thickness detecting rollers to allow a roller that is displaced out of the pair of paper thickness detecting rollers to rotate one or more revolutions by inertia after the paper passes through the pair of paper thickness detecting rollers.

12. The paper thickness detecting device according to claim 1, wherein diameters of rollers of the pair of paper thickness detecting rollers and the pair of conveyance rollers are the same.

13. An image forming apparatus comprising the paper thickness detecting device according to claim 1.

* * * * *